US006533244B1

(12) United States Patent
Falkner

(10) Patent No.: US 6,533,244 B1
(45) Date of Patent: Mar. 18, 2003

(54) BACKWASH FLOW CONTROL VALVE

(76) Inventor: Kemp E Falkner, 3888 N. Ponce de Leon, St. Augustine, FL (US) 32084

( * ) Notice: Subject to any disclaimer, the term of this patent is extended or adjusted under 35 U.S.C. 154(b) by 0 days.

(21) Appl. No.: 10/072,003

(22) Filed: Feb. 11, 2002

Related U.S. Application Data

(62) Division of application No. 09/550,936, filed on Apr. 17, 2000, now Pat. No. 6,413,423.

(51) Int. Cl.[7] ............ F16K 31/00

(52) U.S. Cl. ............ 251/344; 251/352; 137/606; 16/342; 285/325; 604/119

(58) Field of Search ............ 251/344, 352; 137/315.07, 606; 16/342; 285/325; 604/119

(56) References Cited

U.S. PATENT DOCUMENTS

| | | | | |
|---|---|---|---|---|
| 1,662,620 | A | 3/1928 | Patelski | |
| 1,789,390 | A | 1/1931 | Potteiger | |
| 2,755,662 | A | 7/1956 | Shelton | 68/184 |
| 2,834,368 | A | 5/1958 | Gray | 137/271 |
| 3,059,702 | A | 10/1962 | Hebert | 169/37 |
| 3,770,013 | A | 11/1973 | Thompson | 137/606 |
| 4,560,144 | A | 12/1985 | Williams et al. | 25/344 |
| 6,413,423 | B1 * | 7/2002 | Falkner | 210/269 |

* cited by examiner

*Primary Examiner*—Chester T. Barry
(74) *Attorney, Agent, or Firm*—Charles M. Kaplan

(57) ABSTRACT

Apparatus for treating water utilizes a single flow control valve that has only one moving part to divert treated water from several water treatment units to backwash another water treatment unit.

20 Claims, 9 Drawing Sheets

BACKWASH FLOW CONTROL VALVE

This application is a division of U.S. application Ser. No. 09/550,936, filed on Apr. 17, 2000, now U.S. Pat. No. 6,413,423.

BACKGROUND OF THE INVENTION

This invention relates to liquid treatment apparatus, and more particularly to controlling the backwash flow among filters that remove iron from potable water.

OBJECTIVES OF THE INVENTION

Accordingly, it is an object of this invention to provide improved liquid and water treatment apparatus.

Another object is to provide flow control valves that selectively direct or channel treated water for backwashing a selected one of a number of filters.

An additional object is to control with a single valve the flow of backwash water between several filters.

Another object is to provide an integral flow control valve that has only one moving part for diverting backwash water flow among multiple water treating units.

A further object is to provide flow control valves that are durable, relatively economical, easy to use and service, and which do not possess defects found in similar prior art valves.

Other objects and advantages of the liquid and water treating apparatus and the valves incorporating this invention will be found in the specification and claims and the scope of the invention will be set forth in the claims.

DESCRIPTION OF THE INVENTION

Figure 1:
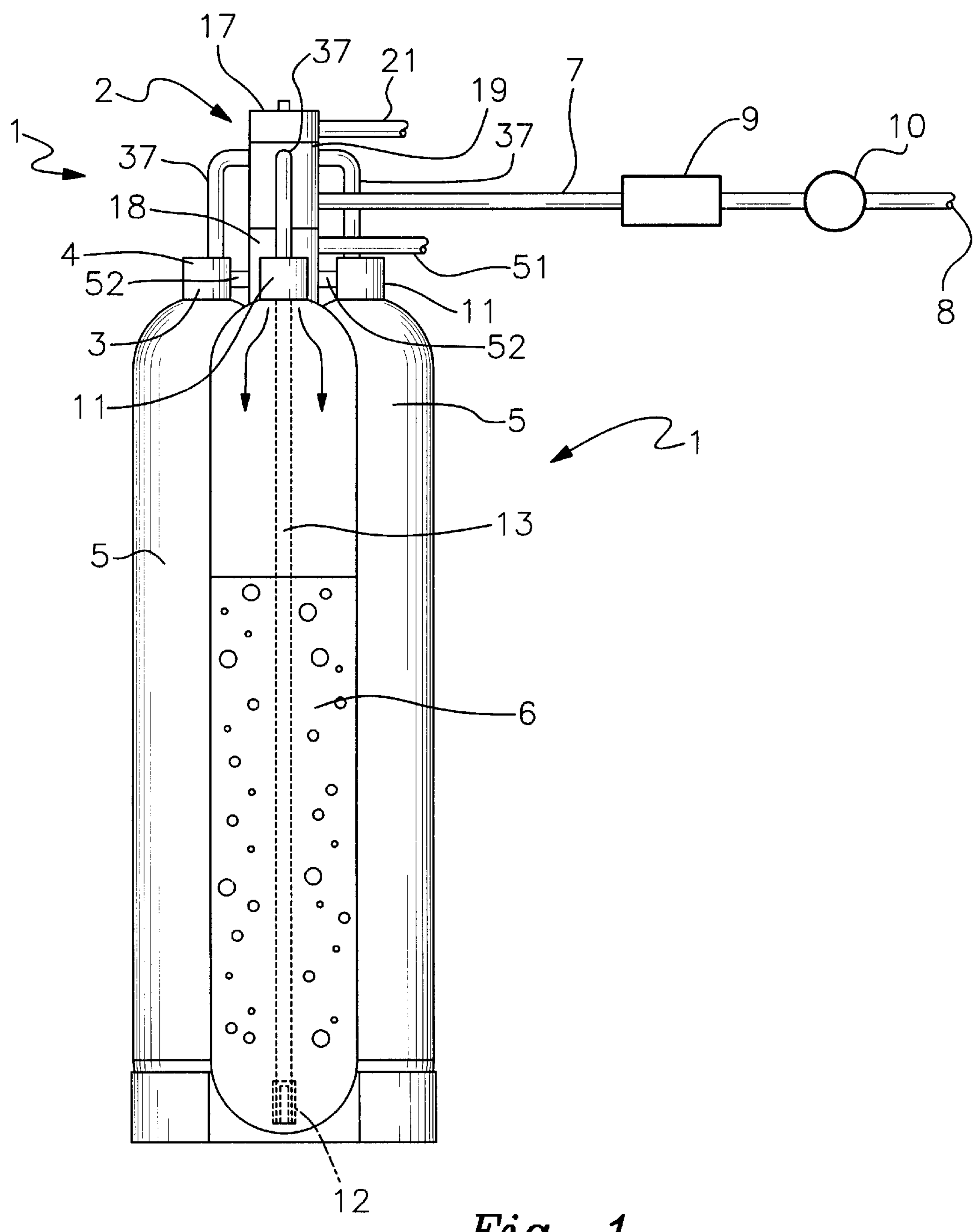
FIG. 1 is a schematic partially cross sectional, side view of water treatment apparatus in accord with this invention.

The drawing shows apparatus 1 for treating liquids that includes a single unitary flow control valve 2 in accord with this invention connected to control the backwash water flow among several parallel connected liquid treatment units. A preferred embodiment of the apparatus 1 has exactly three filter tanks 5 that remove iron form potable water. Each tank 5 contains a bed 6 of about ¾ to 2 cubic feet of Birm® granules. Iron containing potable water from a well or municipal source 8 flows into valve 2 through a supply line 7 after being oxygenated by an aeration blower or venturi 9 and pressurized by a pump 10. To remove iron, the water entering the valve 2 should have a pressure of at least about 40 psi, and the dissolved oxygen content should be at least about 6 ppm. The preferred three tank filtering apparatus will effectively remove iron at concentrations up to about 20 ppm from potable water for residential and small business use, and provide up to about 5–15 gpm at peak flow at a service pressure of about 40–75 psi.

When the service cycle begins, the valve 2 divides the incoming pressurized and oxygenated untreated iron containing water into essentially equal flow volumes that enter each filter tank 5 through an untreated liquid inlet 3 in its top 11. The untreated water flows through the bed 6 of Birm granules in each tank 5 where the iron precipitates, and the precipitated solid particles are filtered out by the bed 6. The iron free treated water enters a strainer 12 at the bottom of an effluent pipe 13 in each tank. The treated effluent flows out of the filter tanks 5 through their pipes 13 to a treated liquid outlet 4 in top 11, and the effluent is collected in and disbursed by valve 2.

The valve 2 is made from three rigid right circular cylindrical hollow plastic modules that are connected together by nuts 15 screwed on several peripherally spaced threaded rods 16 that pass through all of the valve modules. A drain module 17 is located at one end of the valve 2, a treated liquid collection module 18 is located at the opposite end of the valve, and an untreated liquid distribution module 19 is located between modules 17 and 18.

Figure 4:
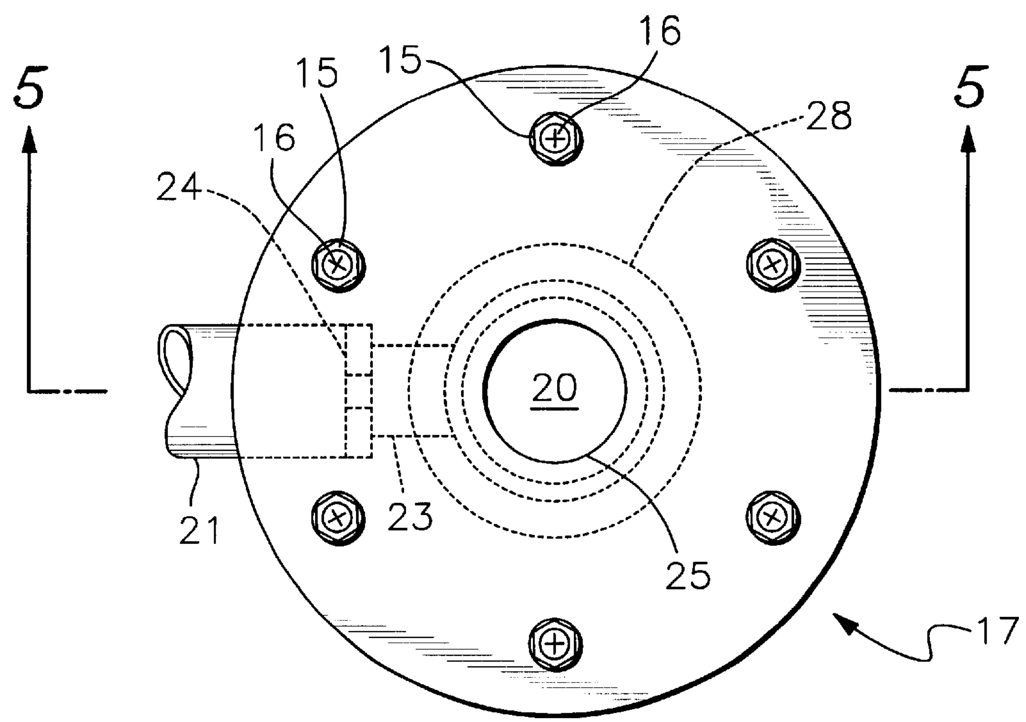
FIG. 4 is a top plan view of the drain chamber module
Figure 5:
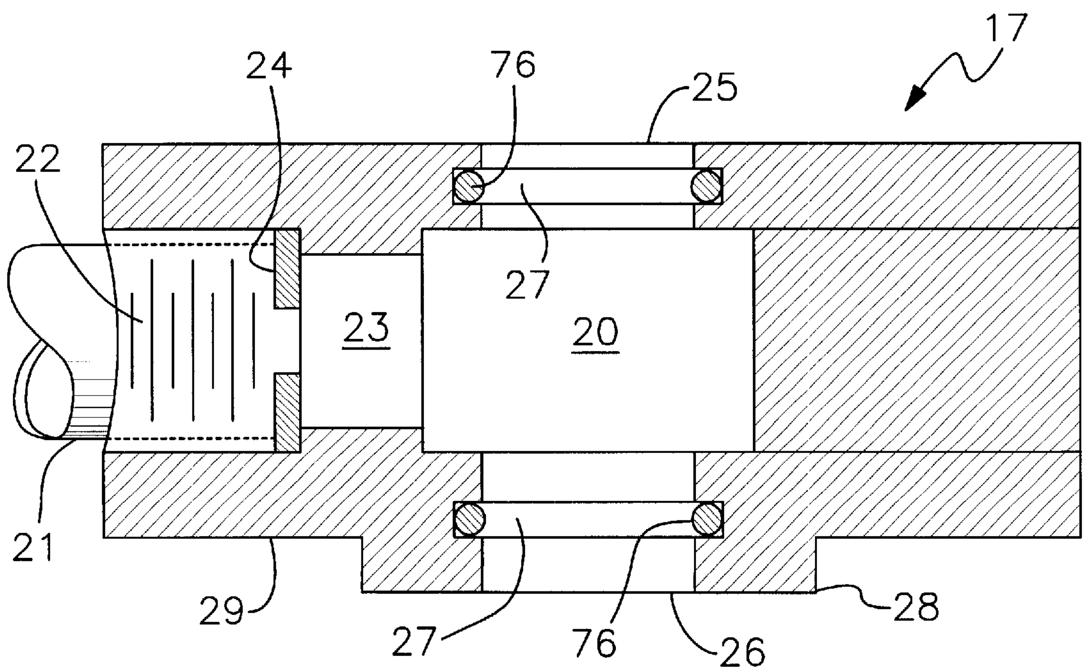
FIG. 5 is an enlarged cross sectional view of the drain chamber module taken along the line 5—5 in FIG. 4.

As shown in FIGS. 4 and 5, the drain module 17 has a cylindrical drain chamber 20 at its center. A drain pipe 21 is threaded into a drain outlet port 22 that communicates with chamber 20 through a hole 23. Drain pipe 21 connects the valve 2 to a waste disposal site such as a sewer line that is at essentially atmospheric pressure. The chamber 20 has essentially the same atmospheric pressure as the drain pipe 21. A doughnut shaped drain pipe flow control restrictor 24 is located between the end of pipe 21 and hole 23. Restrictor 24 controls the drain outlet flow through pipe 21 to the required backwash rate of flow (e.g. about 4–10 gpm) for the size of tank 5 and bed 6 being backwashed. Aligned circular upper and lower bearing holes 25 and 26 are concentric with chamber 20, and O-ring retainer grooves 27 surround the bearing holes. A cylindrical hub 28 protrudes from the one or bottom end 29 of the module 17.

Figure 7:
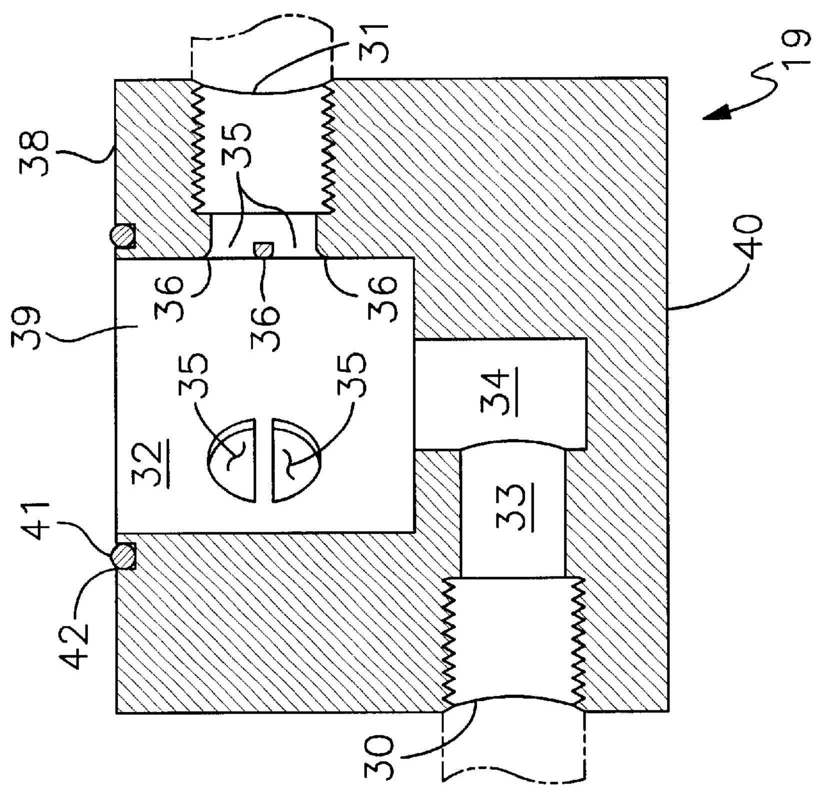
FIG. 7 is a cross sectional view taken along the line 7—7 in FIG. 6.
Figure 6:
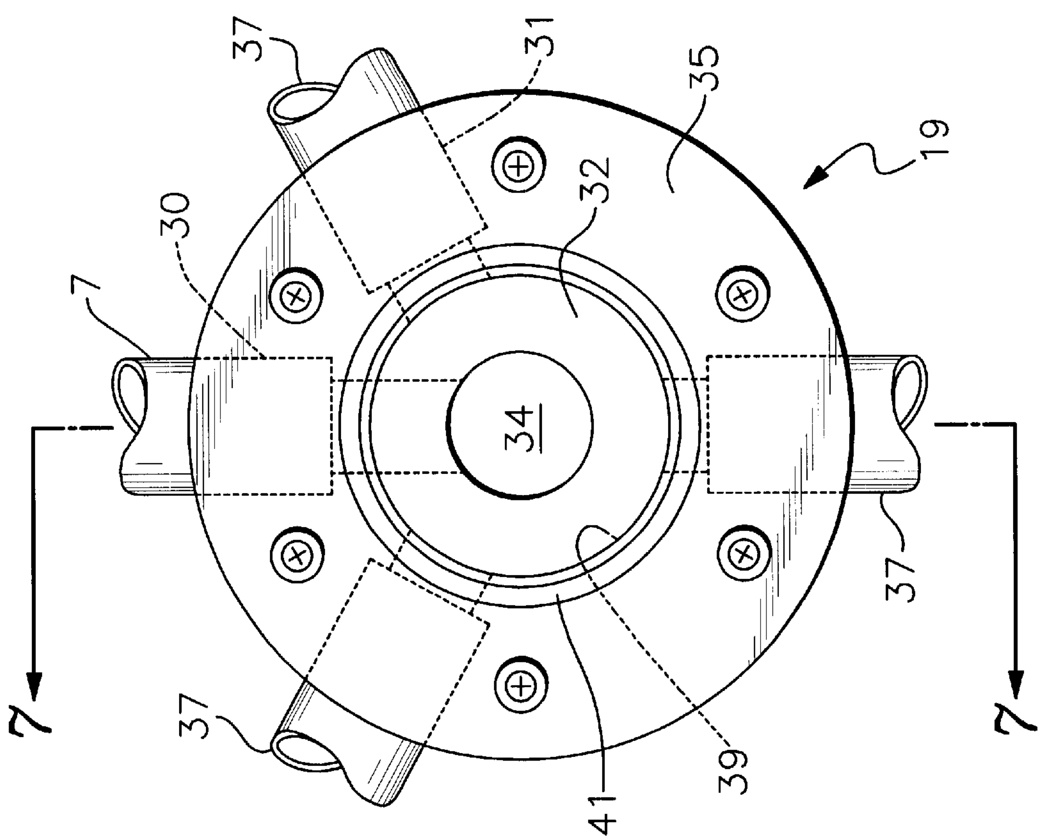
FIG. 6 is a top plan view of the distribution chamber module.

As shown in FIGS. 6 and 7, the untreated liquid or water distribution module 19 has an untreated liquid inlet port 30. Three liquid distribution ports 31 are evenly spaced around its periphery. The port 30 communicates with untreated liquid distribution chamber 32 through relatively large holes 33 and 34, and each port 31 communicates with chamber 32 through a pair of essentially semi circular holes 35. Untreated liquid supply line 7 is threaded into port 30, and untreated liquid distribution lines 37 are threaded into the ports 31. Untreated liquid distribution chamber 32 opens through the top or one wall 38 of module 19, and is centered in the module. The interior wall surface 39 of chamber 32 has the curvature of a right circular cylinder. The bottom or other wall 40 of the module 19 has a flat unbroken surface. An O-ring 41 in a groove 42 surrounding chamber 32 provides a liquid tight seal for the top wall 38.

Figure 9:
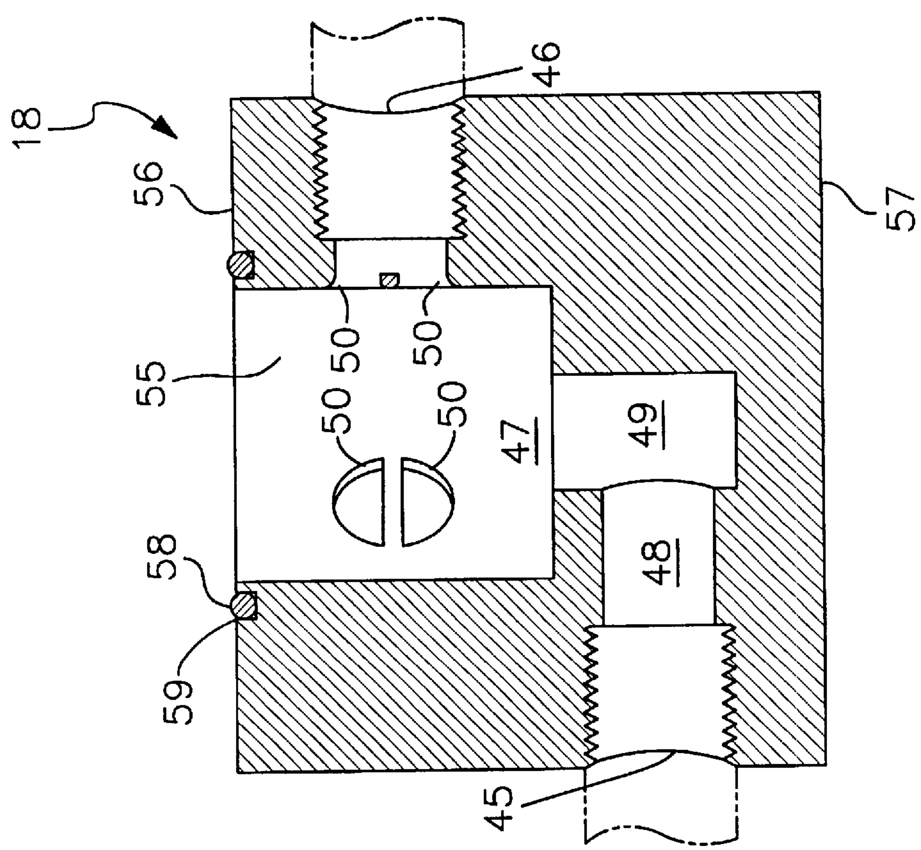
FIG. 9 is a cross sectional view taken along the line 9—9 in FIG. 8.
Figure 8:
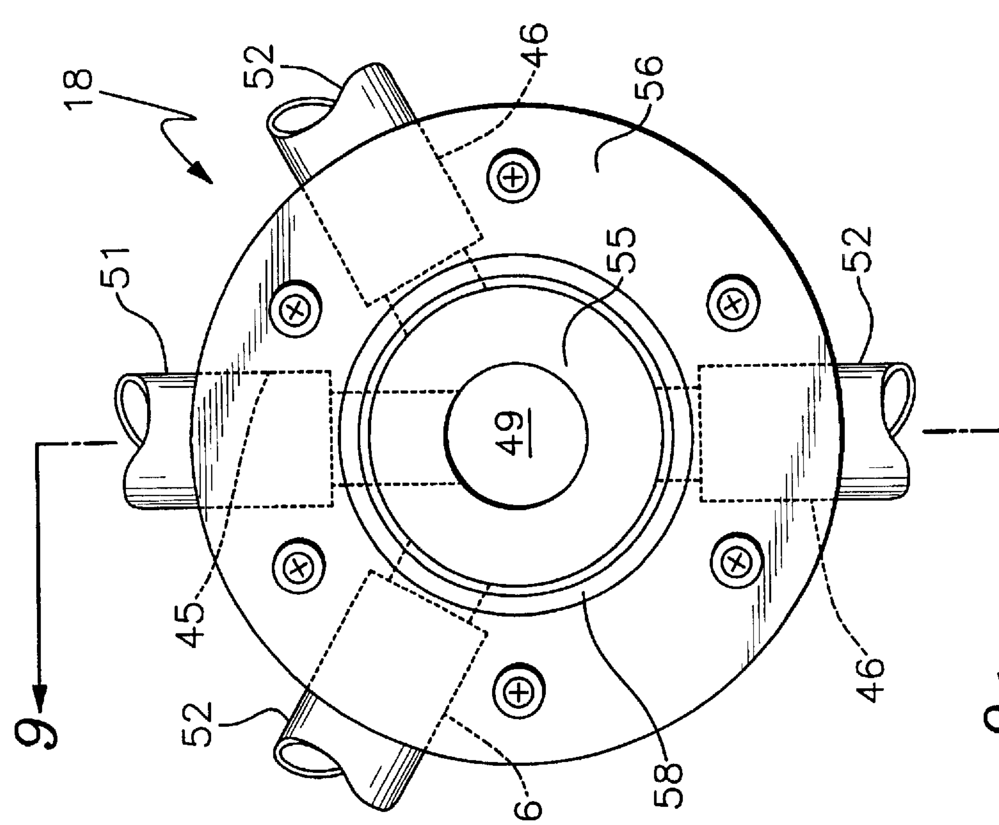
FIG. 8 is a top plan view of the collection chamber module.
Figure 13:
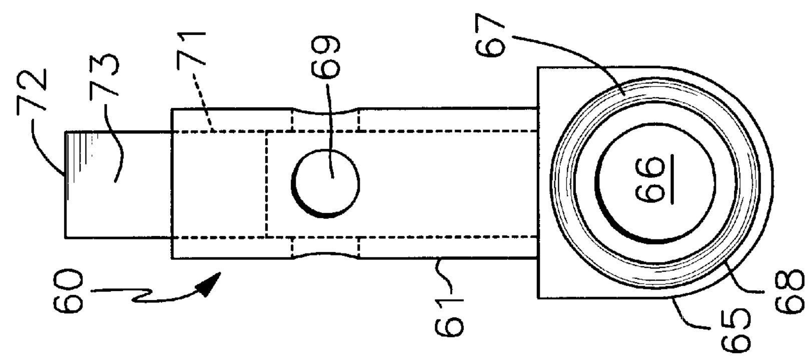
FIG. 13 is a front view of the flow diverter member.
Figure 12:
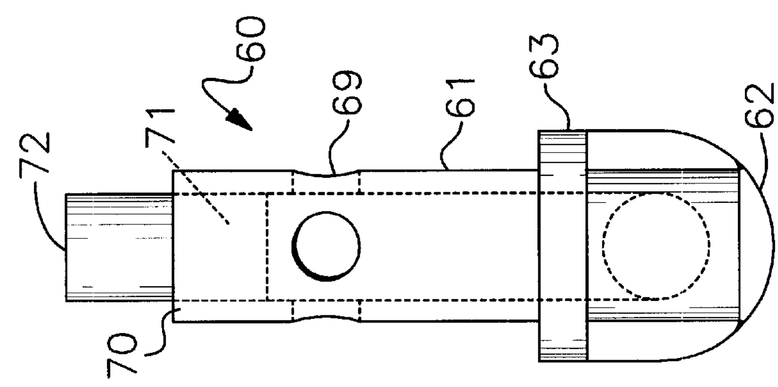
FIG. 12 is a rear view of the flow diverter member.
Figure 11:
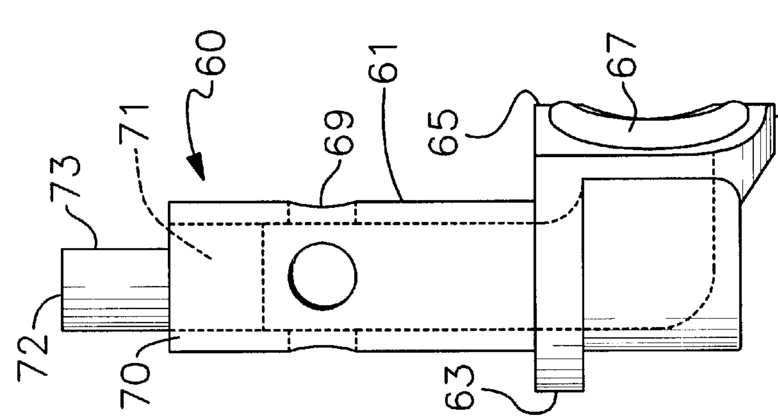
FIG. 11 is a side view of the flow diverter member.
Figure 10:
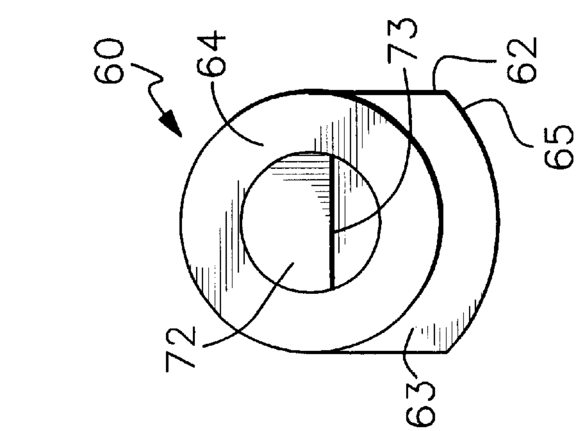
FIG. 10 is an enlarged top plan view of a flow diverter member in accord with this invention.

The size, shape and structure of treated liquid or water collection module 18 are essentially identical to that of liquid distribution module 19, as shown in FIGS. 8 and 9. The treated liquid collection module 18 has a treated liquid outlet port 45 and three treated liquid collection ports 46 that are evenly spaced around its periphery. The port 45 communicates with treated liquid collection chamber 47 through relatively large holes 48 and 49, and ports 46 communicate through a pair of essentially semi circular holes 50. Treated effluent line 51 is threaded into port 45 and treated liquid collection lines 52 are threaded into the ports 46. Treated liquid collection chamber 55 opens through the the top or one wall 56 of module 18, and is centered in the module. The bottom or other wall 57 of the module 18 has a flat unbroken surface. An O-ring 58 in a groove 59 surrounding chamber 55 provides a liquid tight seal for the top wall 56.

Figure 2:
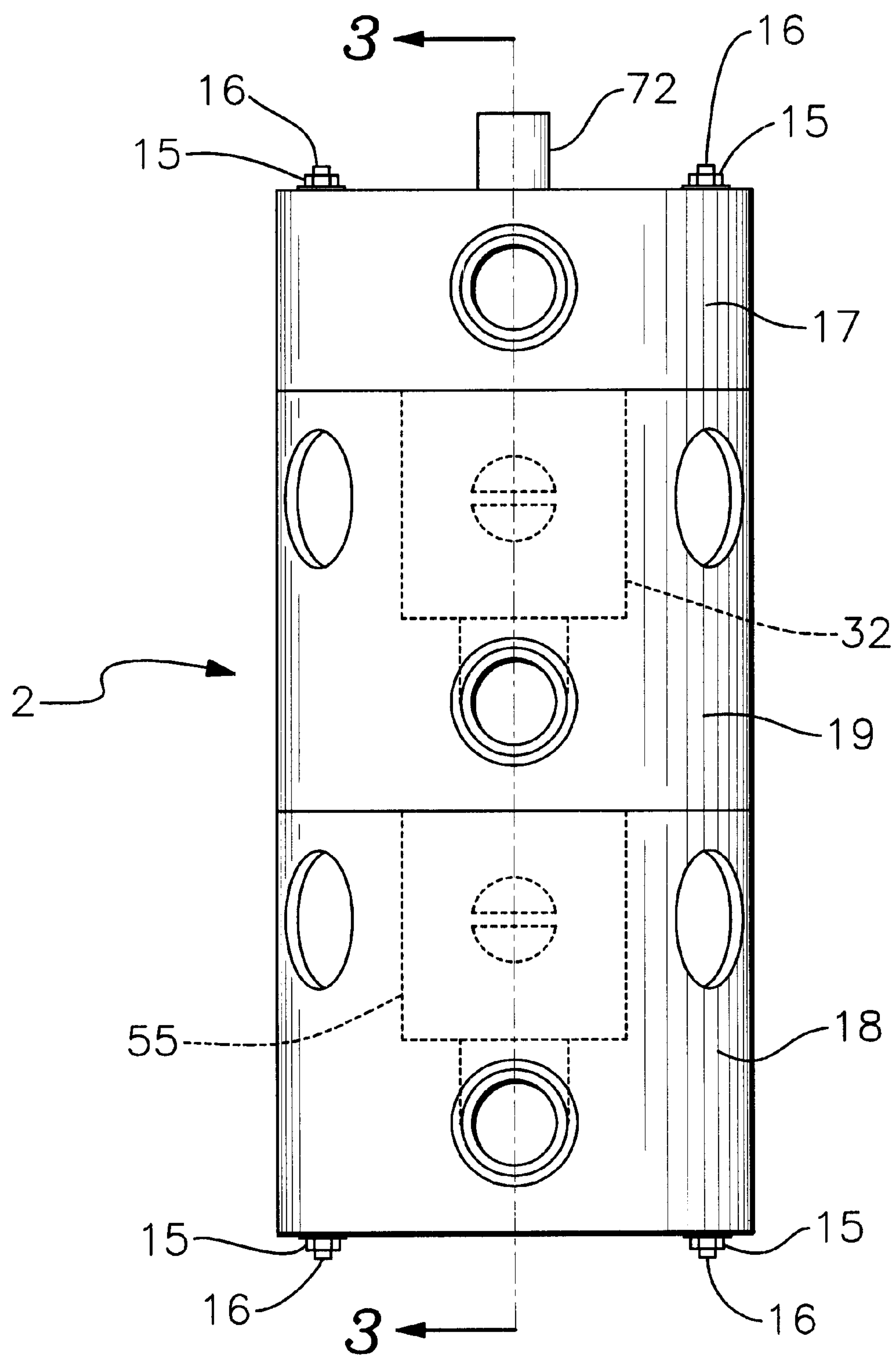
FIG. 2 is side view of the flow control valve shown in FIG. 1.
Figure 3:
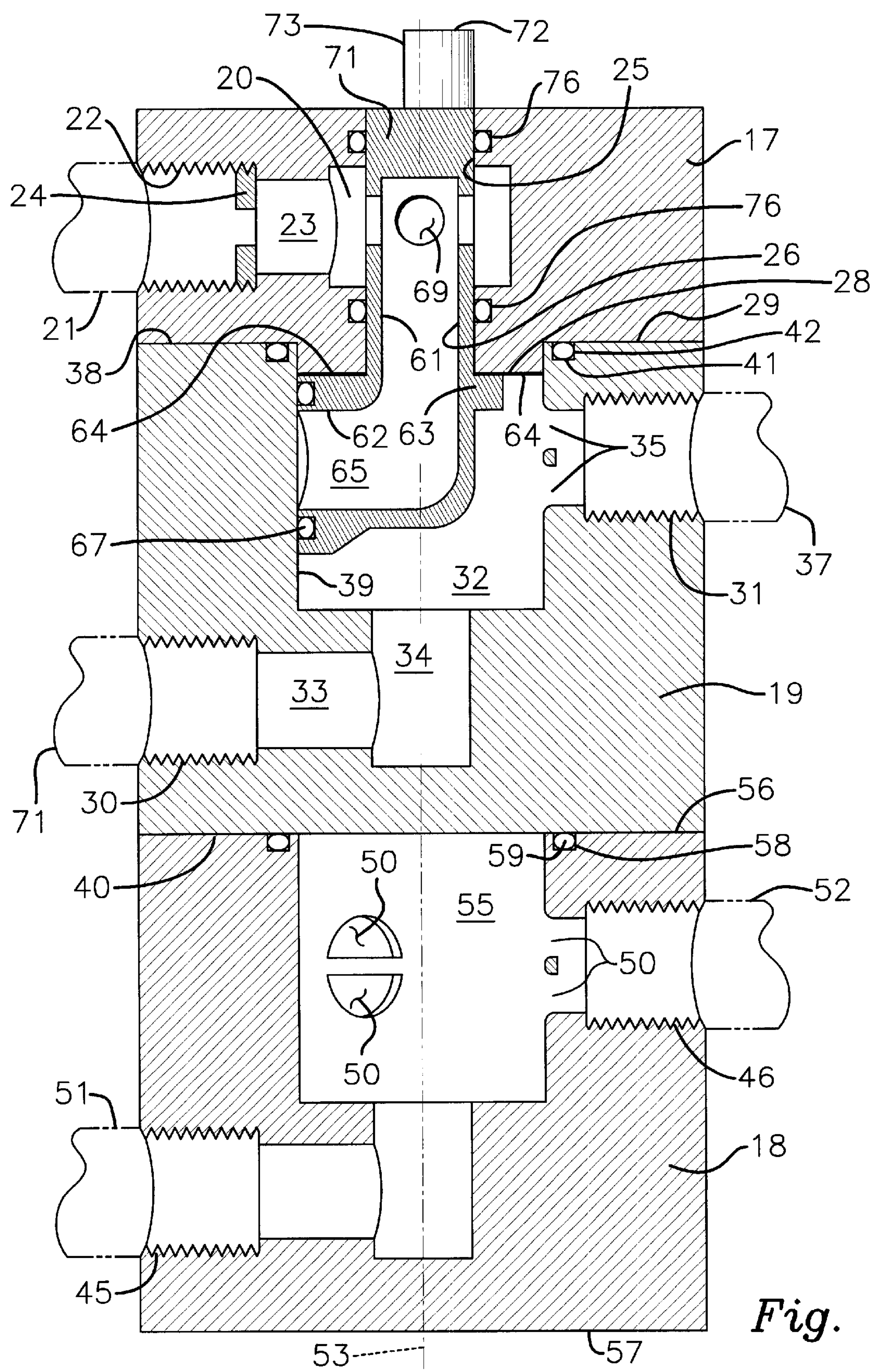
FIG. 3 is an enlarged cross sectional view taken along the line 3—3 in FIG. 2.

When the modules 17, 18 and 19 are assembled as shown in FIGS. 2 and 3, the modules have the same longitudinal central axis 53. The chambers 20, 32 and 55 are also aligned and coincident with the axis 53. The hub 28 of module 17 fits tightly into the top of liquid distribution chamber 32, and O-ring 41 makes a liquid tight seal between the bottom end 29 of module 17 and the top wall 38 of module 19. Bearing holes 25 and 26 are also centered on axis 53. O-ring 58 makes a liquid tight seal between the bottom end 40 of module 19 and the top wall 56 of module 18. The modules 17, 18 and 19 may be made from any durable, non corrodible hard plastic such as polyvinyl chloride or nylon, that does not breakdown in the liquid being treated.

A hollow, tubular, generally L-shaped flow diverter member 60 can be rotated to control the flow of backwash water or other liquid from the filters 5. Flow diverter 60 has a relatively long leg portion 61 and a relatively short foot portion 62. A cylindrical ledge 63 overlies the foot portion, and a flat washer 64 on the ledge surrounds the leg portion. The foot portion 62 has a curved terminal end surface 65 that has a curvature that matches the right circular cylindrical curvature of the interior wall surface 39 of the chamber 32. A circular entrance hole 66 through end surface 65 is dimensioned to surround and encompass both holes 35 of each port 31, and thereby to isolate such port 31. An O-ring 67 in a groove 68 makes a liquid tight seal with surface 39 around hole 66. Leg portion 61 has several spaced holes 69 adjacent its upper end 70. A solid plug 71 fills the end 70. A valve stem 72 that is integral with plug 71 extends from diverter 60. Stem 72 is flattened at 73 to facilitate gripping of the stem by hand or wrench for rotating the diverter 60 to its operating positions. An electrical timer (not shown) may be connected to stem 72 for rotating the diverter 60. Flow diverter member 60 should be made from the same plastic as the modules 17–19.

FIG. 3 shows that when the parts of valve 2 are assembled, the leg portion 61 of the flow diverter extends through bearing holes 25 and 26 into the interior of drain chamber 20 while the foot portion 62 remains entirely in the untreated liquid distribution chamber 32. The ledge 63 bears against hub 28, and a slick thrust bearing surface is provided by flat TEFLON washer 64. O-rings 76 in the grooves 27 seal around the leg portion 61. Holes 69 provide a liquid flow path from the hollow interior of flow diverter 60 to the drain chamber 20. The end surface 65 mates with the curved surface of wall 39, and O-ring 67 seal the hole 65. Entrance hole 66 is vertically positioned encompass holes 35. The edges 36 of holes 35 are rounded to minimize wear on O-ring 67.

Figure 14:
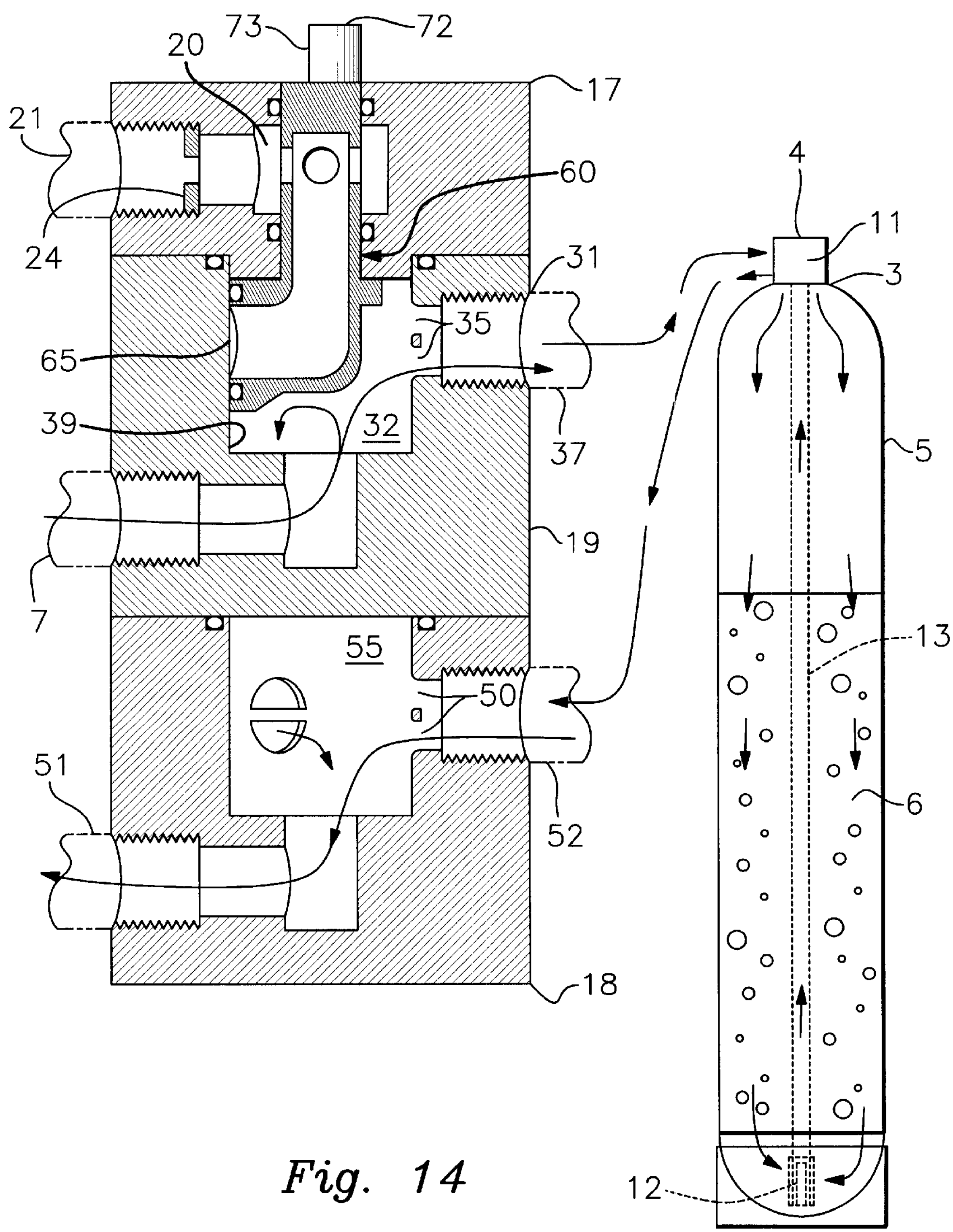
FIG. 14 is a schematic cross sectional side view showing the flow during the service cycle.

During the service cycle, as shown in FIG. 14, the end surface 65 of flow diverter member 60 contacts the interior wall surface 39 of chamber 32 at an inactive position located between the untreated liquid distribution ports 31. The seals and gaskets prevent any liquid from flowing into flow diverter member form either chamber 32 or chamber 20. Pressurized untreated liquid from line 7 flows into distribution chamber 32 and flows out through pipes 37 into the inlets 3 in the tops 11 of the filter units 5. The liquid flows through the beds 6 where impurities are removed. The treated liquid enters each strainer 12 and flows through pipe 13 and out of the filter outlet 4 to a treated liquid return line 52 and into treated liquid collection chamber 55. The treated liquid is available for service use through service outlet line 51.

Figure 15:
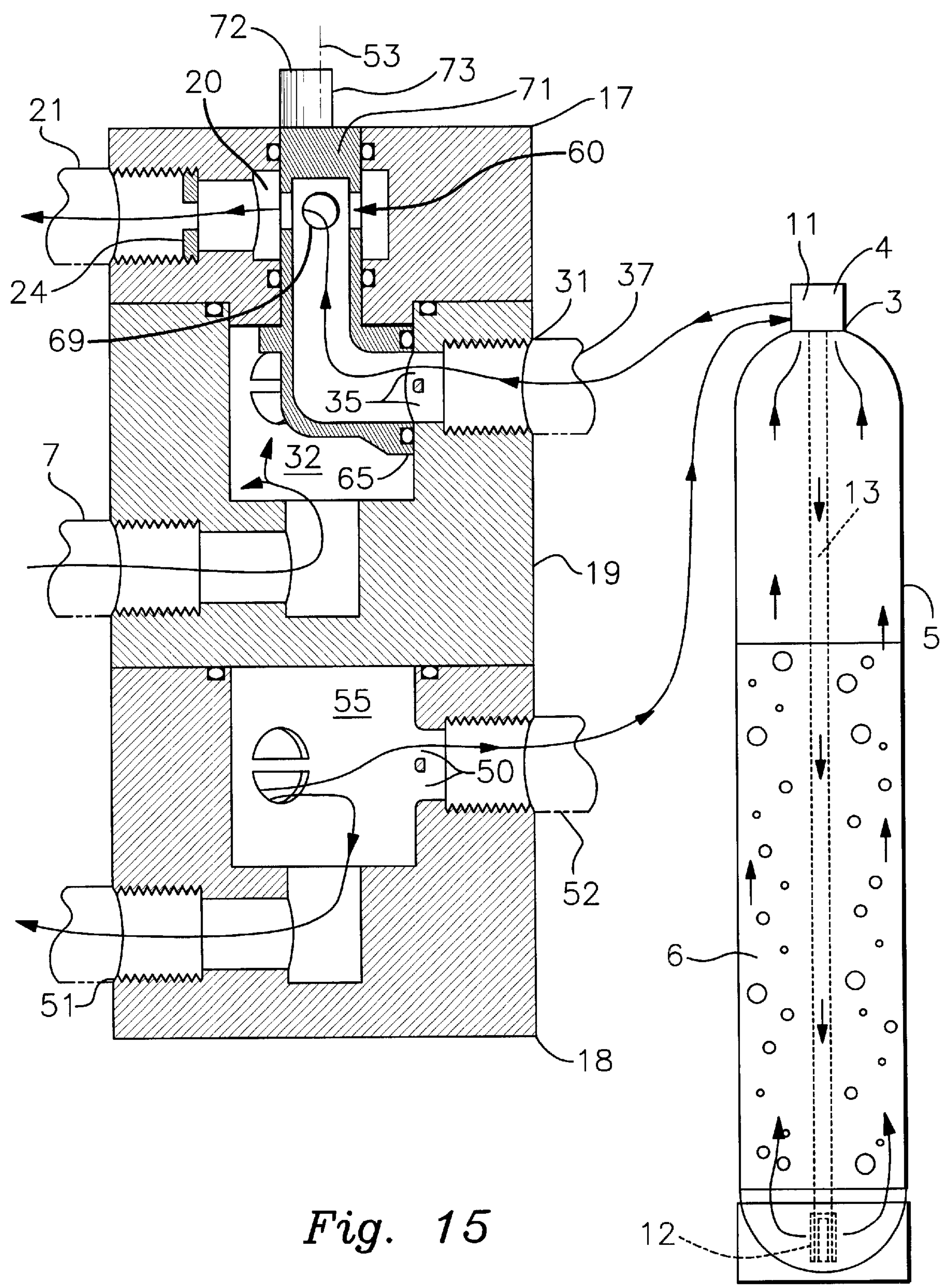
FIG. 15 is a schematic cross sectional side view showing flow during a backwash cycle.

The filter beds 6 must be backwashed periodically. In the preferred embodiment, iron is precipitated from potable water in a bed of Birm granules, which may be backwashed to remove the precipitated solids late each night when the demand for treated water is lowest. FIG. 15 shows the position of the flow diverter member 60 during a backwash cycle. The flow diverter member 60 has been rotated around the axis 53 by turning stem 72 until the diverter is aligned with a port 31 associated with a filter 5 that has been selected for backwashing. The diverter terminal end surface 65 has encompassed the holes 35 and sealed them from the water and pressure in chamber 32. The hollow interior of the flow diverter member is connected to the drain line 21 through its holes 69 and chamber 20. The result is that the pressure at the selected port 31 has been reduced to the essentially atmospheric pressure of the drain line 21. But the pipe 13 and strainer 12 at the bottom of bed 6 are still in fluid communication through a line 52 with the treated liquid chamber 55. The treated liquid collection chamber 55 is at the higher pressure of service line 51. This causes the treated water from treated liquid collection chamber 55 to reverse its flow direction through the line 52 of the selected filter unit so that the treated water enters the bed 6 through pipe 13 and strainer 12 and flows upwardly backwashing the bed 6. The backwash water flows out of the selected unit 5 through its inlet 4 and line 37 to the selected port 31. The flow continues through the selected port 31 and into the hollow interior of flow diverter member 60, out through the holes 69 into the chamber 20, and finally to disposal through drain line 21. Treated water continues to be available from line 51.

In the preferred embodiment, the backwash cycle for each unit takes about five minutes. After the first selected filter unit 5 has been backwashed, the flow diverter member 60 is rotated to the next selected filter unit 5. This moves the end surface 65 away from the holes 35 of the first selected filter unit, so the water flow and pressure at the port 31 of the first selected unit return to the service cycle values. The backwash cycle of the second selected filter unit is initiated by rotation of the end surface 65 into position surrounding the holes 35 of the second selected port 31 as shown in FIG. 15, and the backwash cycle continues as explained above. After the second selected filter unit has been backwashed, the flow diverter member 60 is rotated so as to encompass the holes 35 of the port 31 of the filter unit selected last, and the backwash cycle resumes as explained above. After all three filter units have been backwashed, the flow diverter member 60 is rotated to an inactive position between the ports 31 as shown in FIG. 14, and the full flow of treated liquid becomes available for service through line 51.

While the present invention has been described with reference to a particular embodiment, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. An integral liquid flow control valve comprising, a hollow liquid collection module at one end, said liquid collection module having a cylindrical liquid collection chamber at its center and a plurality of symmetrically spaced liquid collection ports around its periphery and a liquid outlet port, all of the ports communicating with said liquid collection chamber; a hollow drain module at an opposite end of said valve, said drain module having a drain outlet chamber at its center and a drain outlet port communicating with said drain outlet chamber; a liquid distribution module located between said drain module and said liquid collection module, said liquid distribution module having a liquid distribution chamber at its center, a plurality of symmetrically spaced liquid distribution ports around its periphery, and a liquid inlet port, said liquid distribution chamber having a right circular cylindrical interior wall surface curvature, said modules all being concentrically and axially aligned along a common longitudinal central axis and being immovably attached to each other;

said liquid distribution module having one wall contacting a wall of said liquid collection module and an opposite wall contacting a wall of said drain module, there being identical aligned holes in said wall of said drain module and said one wall of said liquid distribution module; and a hollow tubular flow diverter extending through said aligned holes and having a perforated end in said drain outlet chamber and an open end in said liquid distribution chamber; said flow diverter being rotatable to selectively provide a flow channel between each of said liquid distribution ports and said drain outlet chamber.

2. The integral liquid flow control valve defined in claim 1, wherein said open end of said flow diverter has a terminal end surface curved to mate with the cylindrical curvature of said interior wall surface of said liquid distribution chamber, and said curved terminal end surface being in continuous contact with said interior wall of said liquid distribution chamber.

3. The integral liquid flow control valve defined in claim 1, wherein said flow diverter is generally L-shaped.

4. The integral liquid flow control valve defined in claim 1, wherein said flow diverter is generally L-shaped and has a relatively long leg portion and a relatively short foot portion, said leg portion extending through said aligned holes with said foot portion including said curved terminal end surface being located entirely in said liquid distribution chamber.

5. The integral liquid flow control valve defined in claim 4, wherein an open end of said foot portion has an opening there through sized to encompass each of said liquid distribution ports, and a water tight gasket in said curved surface of said flow diverter sealing said open end surface against said interior wall surface of said liquid distribution chamber.

6. The integral liquid flow control valve defined in claim 4, further comprising a plug closing an end of said leg of said flow diverter, a portion of said plug extending from said valve so as to provide a stem for rotating said flow diverter.

7. The integral liquid flow control valve defined in claim 1, wherein rotation of said flow diverter so as to provide a flow channel between a selected liquid distribution port and said drain outlet chamber simultaneously sealing said selected liquid distribution port from said liquid distribution chamber.

8. A liquid flow control valve comprising, a hollow liquid collection module having a cylindrical liquid collection chamber at its center and a plurality of liquid collection ports around its periphery and a liquid outlet port, all of the ports in said liquid collection module communicating with said liquid collection chamber; a hollow drain module having a drain outlet chamber at its center and a drain outlet port communicating with said drain outlet chamber; a liquid distribution module having a liquid distribution chamber at its center, a plurality of liquid distribution ports around its periphery, and a liquid inlet port, said liquid distribution chamber having a curved interior wall surface, said modules all being concentrically and axially aligned along a common longitudinal central axis, there being identical aligned holes in a wall of said drain module and a wall of said liquid distribution module; and a flow diverter extending through said aligned holes and having an end in said drain outlet chamber communicating with said drain outlet chamber and an open end in said liquid distribution chamber, said flow diverter being rotatable to selectively provide a flow channel between each of said liquid distribution ports and said drain outlet chamber.

9. The liquid flow control valve defined in claim 8, wherein rotation of said flow diverter so as to provide a flow channel between a selected liquid distribution port and said drain outlet chamber simultaneously seals said selected liquid distribution port from said liquid distribution chamber.

10. The liquid flow control valve defined in claim 8 wherein said open end of said flow diverter has a terminal end surface curved to mate with the curved interior wall surface of said liquid distribution chamber, and said curved terminal end surface being in continuous contact with said interior wall of said liquid distribution chamber.

11. The liquid flow control valve defined in claim 8 wherein said flow diverter is generally L-shaped.

12. The liquid flow control valve defined in claim 11 wherein said flow diverter has a relatively long leg portion and a relatively short foot portion, said leg portion extending through said aligned holes with said foot portion including a curved terminal end surface being located entirely in said liquid distribution chamber.

13. The liquid flow control valve defined in claim 12, wherein said foot portion has an open end surface with an hole there through sized to encompass each of said liquid distribution ports, and a water tight gasket in said curved surface of said flow diverter sealing said open end surface against said interior wall surface of said liquid distribution chamber.

14. The liquid flow control valve defined in claim 12, further comprising a plug closing an end of said leg of said flow diverter, a portion of said plug extending from said valve so as to provide a stem for rotating said flow diverter.

15. A liquid flow control valve comprising, a liquid collection chamber having a plurality of liquid collection ports around its periphery and a liquid outlet port communicating therewith; a drain outlet chamber having a drain outlet port communicating therewith; a liquid distribution chamber having a liquid inlet port and having a plurality of liquid distribution ports around its periphery, said liquid distribution chamber having a curved interior wall surface, said liquid collection chamber and said drain outlet chamber and said liquid distribution chamber all being concentrically and axially aligned along a common central axis, there being holes aligned in a surface of said drain chamber and a surface of said liquid distribution chamber; and a flow diverter extending through said aligned holes and having an end in said drain chamber that communicates with said drain chamber and an open end in said liquid distribution chamber, said flow diverter being movable to selectively provide a flow channel between each of said liquid distribution ports and said drain outlet chamber.

16. The liquid flow control valve defined in claim 15, wherein movement of said flow diverter so as to provide a flow channel between a selected liquid distribution port and said drain outlet chamber simultaneously seals said selected liquid distribution port from said liquid distribution chamber.

17. The liquid flow control valve defined in claim 15, wherein said open end of said flow diverter has a terminal end surface curved to mate with the curved interior wall surface of said liquid distribution chamber, and said curved terminal end surface being in continuous contact with said interior wall surface of said liquid distribution chamber.

18. The liquid flow control valve defined in claim 15, wherein said flow diverter is generally L-shaped.

19. The liquid flow control valve defined in claim 15, wherein said flow diverter is generally L-shaped and has a relatively long leg portion and a relatively short foot portion, said leg portion extending through said aligned holes with said foot portion including a curved terminal end surface that is located entirely in said liquid distribution chamber.

20. The liquid flow control valve defined in claim 19, wherein said terminal end surface of said foot portion has an opening there through sized to encompass each of said liquid distribution ports, and a water tight gasket in said curved surface of said flow diverter seals said open end surface against said interior wall surface of said liquid distribution chamber.

* * * * *